United States Patent [19]

Steffens et al.

[11] Patent Number: 5,431,117
[45] Date of Patent: Jul. 11, 1995

[54] SEED DRUM ROW SHUTOFF FOR PLANTER

[75] Inventors: Bruce J. Steffens; Douglas B. Steffen; Louis Stirek, all of Griswold, Iowa

[73] Assignee: Triple S Engineering, Inc., Griswold, Iowa

[21] Appl. No.: 103,117

[22] Filed: Aug. 9, 1993

[51] Int. Cl.$^6$ .............................................. A01C 7/00
[52] U.S. Cl. ...................... 111/180; 221/211; 221/278
[58] Field of Search ............... 111/182, 170, 174, 178, 111/179, 180, 181, 182; 221/211, 278

[56] References Cited

U.S. PATENT DOCUMENTS

| | | | |
|---|---|---|---|
| 2,571,579 | 10/1951 | Jones | 221/211 |
| 3,637,108 | 1/1972 | Loesch et al. | 221/211 |
| 3,731,842 | 5/1973 | Schlegel | 221/278 |
| 3,762,603 | 10/1973 | Bauman et al. | 221/211 |
| 3,790,026 | 2/1974 | Neumeister | 221/211 |
| 3,848,552 | 11/1974 | Bauman et al. | 221/211 X |
| 3,860,146 | 1/1975 | Bauman et al. | 221/211 |
| 3,874,655 | 4/1975 | Allen et al. | 221/278 X |
| 3,885,704 | 5/1975 | Lienemann et al. | 221/211 |
| 4,148,414 | 4/1979 | Parks, Jr. | 221/278 |
| 4,210,260 | 7/1980 | Luttrell | 221/211 |
| 4,756,101 | 7/1988 | Friberg et al. | 37/244 |
| 5,231,940 | 8/1993 | Tjeerdsma | 111/182 |

Primary Examiner—Dennis L. Taylor
Assistant Examiner—V. Batson
Attorney, Agent, or Firm—Zarley, McKee, Thomte, Voorhees, & Sease

[57] ABSTRACT

An external shutoff element for a multiple row pneumatic seed planter having a transverse frame, a plurality of seed planting elements thereon, a hollow rotary seed selector drum with a plurality of spaced apart rows of seed retaining perforations which correspond to the planting elements, an airblower forcing air outwardly from within the drum thereby suspending individual seeds in a depression associated with each perforation so long as the perforation is not blocked, a discharge portion for dislodging the seeds from the perforations and delivering them to the respective planting elements, the improvement comprising a shutoff element movably mounted on the frame above the discharge portion for selectively engaging the outside of the drum to cover a group of rows of perforations so that the usual radial pneumatic bias generated by the airblower ceases to hold the seeds in the covered rows of perforations and they fall before the discharge portion can deliver them for planting. Electrical control and actuating elements including solenoids, switches and indicator lights are also connected to the shutoff elements to allow an operator in the cab of the tractor to selectively shut off rows of the planter.

2 Claims, 3 Drawing Sheets

SEED DRUM ROW SHUTOFF FOR PLANTER

BACKGROUND OF THE INVENTION

The present invention relates to the field of agricultural implements and in particular to a multiple row pneumatic seed planter having a rotary seed drum.

Multiple row pneumatic seed planters with a rotary seed drum like that shown by Bauman et al. in U.S. Pat. No. 3,860,146 have been helpful in increasing farm productivity. The assignee of the Bauman et al. patent, International Harvester Company, has incorporated that invention into its Case IH 800 and 900 Series Cyclo Air Planters. In general, air planters are hitched and pulled behind a conventional farm tractor. The planter has a transverse frame supported by a plurality of wheels with a seed storage bin which feeds the seeds into one or more rotary drums. The inside of the drum has a plurality of circular rows of depressions. Each depression has a seed retaining perforation formed therein which passes through the circumference of the drum. The perforations are slightly smaller than the seeds.

An airblower forces air outwardly from inside the drum and out the perforations. Seeds from the storage bin are fed into the drum and gravity urges them toward its bottom. As the drum rotates in a counterclockwise direction (when viewed from behind the planter) most of the seeds fall away from the inside wall of the drum, with the exception of those in the depressions. As the drum continues to rotate toward a twelve o'clock position, centrifugal force and the force of the air blown around the individual seeds and out the perforation overcome gravity to suspend the seeds in the depression. This phenomena is described as radial pneumatic bias by Bauman et al. in U.S. Pat. No. 3,860,146.

At a further advanced position of drum rotation, the rollers of a discharge means cover all the rows of perforations as they pass. When the perforations are covered, the radial pneumatic bias which holds the associated seeds is disrupted and the seeds are dislodged. Seeds fall inside the drum and into a corresponding manifold for each row. The seeds are then conducted by conventional means to the planting rows.

These planters can efficiently plant from four to 24 rows of seed crops in one pass, depending on the number of rotary drums on the planter and the rows of seed retaining perforations thereon. However, few fields are perfectly square and open on all sides to accommodate turning the tractor and planter around. Farmers often make use of end rows, terracing, and other techniques to utilize their land fully and optimize yields. Such planting patterns present some problems for the conventional multiple row planter. When the farmer turns the tractor with planter attached around in the end row, or other already planted area, it would be desirable to shutoff a portion of the planter. Additional seed would not be planted there. This would avoid increasing the density of seed planted in that area. Yields in the end rows and other rows where overlapping occurs would not suffer due to overpopulation.

Therefore, it is the primary object of this invention to provide a seed drum row shutoff for a planter which gives the operator the flexibility to reduce overplanting in point rows, end rows, partial rows, and between terraces by shutting off more than one row of the planter at a time.

Another object of this invention is to provide a seed drum row shutoff which conserves seed by reducing overplanting in point rows, end rows, partial rows, and between terraces.

Another object of this invention is to provide a seed drum row shutoff which is simple and easy to install either as original equipment or as an accessory to an existing planter.

Another object of the present invention is to provide a seed drum row shutoff which allows the operator to increase yields by avoiding plant overpopulation.

Another object of the present invention is to provide a seed drum shutoff which diverts the supply of seeds destined for more than one planting element by releasing the seeds from the drum periphery before they reach the manifold of the discharge means.

Another object of the present invention is to provide a seed drum shutoff which is movably mounted external to the seed drum such that the seed drum, discharge means, and planting elements are still readily accessible and removable.

Another object of the present invention is to provide a seed drum shutoff which is movable against the exterior of the drum when an electric solenoid is energized by a switch in a control box remotely mounted in the cab of the tractor pulling the planter.

Another object of the present invention is to provide a seed drum shutoff which the operator can use to selectively shut off the right or left side of a four to twenty-four row planter.

SUMMARY OF THE INVENTION

The present invention is an external shutoff means mounted on a multiple row pneumatic seed planter to selectively engage the seed drum thereof and thereby divert seed from being planted in more than one row of a field. The shutoff means has one or more swingably mounted rollers which are urged by operator controlled electrical solenoids into contact with the drum above the discharge means. During their contact with the exterior of the drum the soft, resilient rollers cover rows of perforations in the drum. Seeds, which are normally held inside the drum by radial pneumatic bias at these perforations, fall back to the bottom of the drum before they can be discharged for planting. When multiple rollers are utilized on a given drum, additional solenoids and independent means for swinging the rollers against the drum provide the flexibility to prevent the planting of groups of field rows. An electrical control box makes it convenient for the operator to control the shutoff means remotely from the cab of the tractor.

DESCRIPTION OF THE PREFERRED EMBODIMENT

Figure 1:
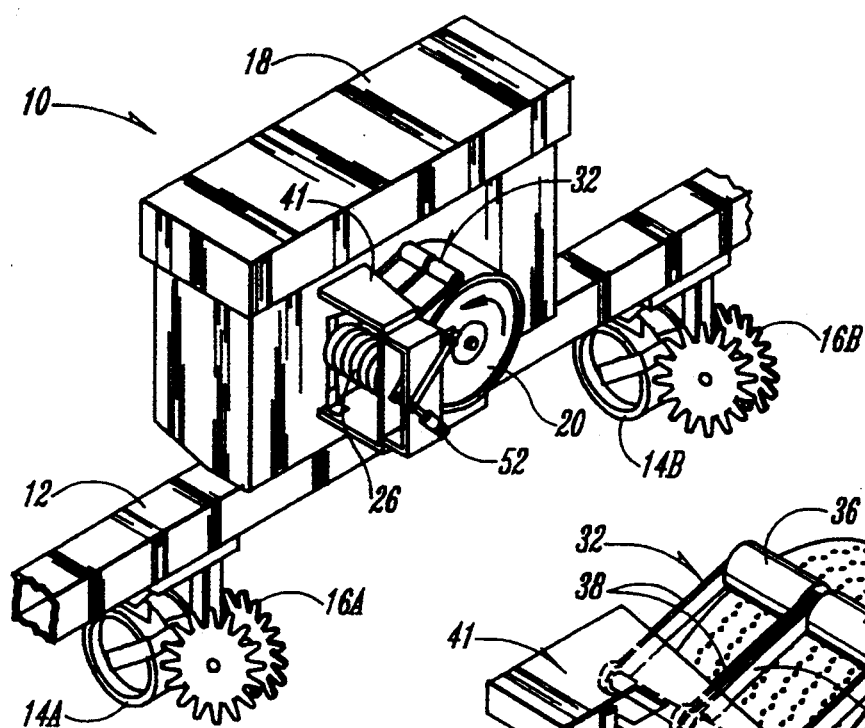
FIG. 1 is a perspective view of a multiple row pneumatic seed planter having the shutoff mechanism of this invention.

In FIG. 1, reference numeral 10 generally refers to a multiple row pneumatic seed planter having the present invention. Planter 10 has a transverse frame 12 supported by a plurality of wheels exemplified by 14A, 14B, etc. Planting elements 16A, 16B, etc. are attached to frame 12 behind the associated wheels 14A, 14B, etc. to cultivate the ground and plant a row of seeds therein. A hitch (not shown) is attached to frame 12 so that planter 10 may be drawn behind a tractor (also not shown) in the conventional manner.

A bin 18 for holding seed is mounted on frame 12. Attached to the rear of bin 18 is a horizontal rotary seed drum 20 which receives seed therefrom. Drum 20 is hollow and rotates in a counterclockwise direction as shown.

Figure 3:
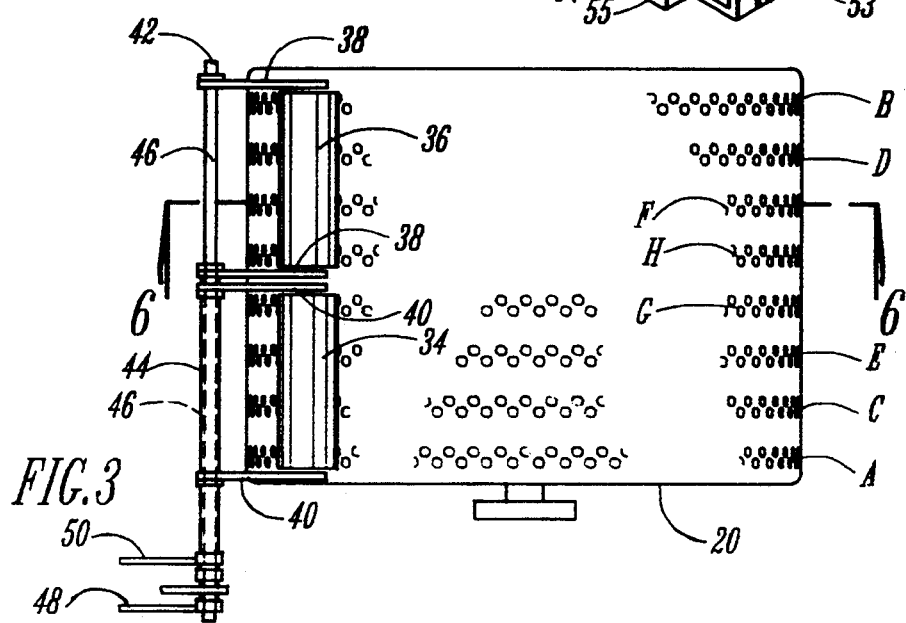
FIG. 3 is a top view of the drum showing two shutoff rollers, each poised over one-half the rows of the drum.
Figure 6:
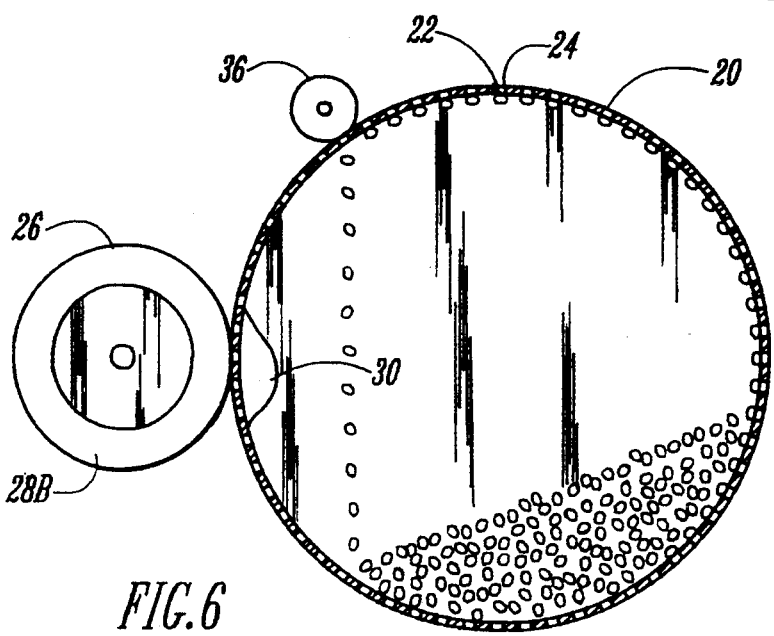
FIG. 6 is a view taken along line 6—6 of FIG. 3. This view shows how the shutoff rollers cover the seed retaining perforations to dislodge the seeds before they reach the discharge means.

As is conventional, the inner circumference of drum 20 has a plurality of circular rows of spaced-apart outward depressions 22 into which seeds can easily fit. Each depression 22 has a central perforation 24 therein, not as big as a seed, but extending through the wall of drum 20. FIGS. 3 and 6 provide the best general views of the area surrounding the perforations.

FIG. 6 shows that seed from bin 18 is deposited as a seed mass at a six o'clock position inside drum 20. The interior of drum 20 is also connected to a conventional airblower (not shown). Individual seeds come to rest in the depressions and are carried toward the top of drum 20 as it rotates counterclockwise. Acting alone, the centrifugal force from the rotating drum would be insufficient to counteract the force of gravity acting on the seeds which are carried into the upper portion of drum 20. The seeds should fall from the depressions back to the bottom of drum 20. However, the outrushing air generated by the airblower assists as it flows around the seeds carried in the depressions and out the perforations. The outrushing air creates a radial pneumatic bias which keeps the seed suspended in the depression, so long as the associated perforation is not fully blocked.

Conventional planters allow the suspended seed to be carried to a twelve o'clock position or beyond. There a discharge means 26 dislodges seed from a single row of perforations, such as B, and supplies the dislodged seed to corresponding planting elements, such as 16B. Discharge means 26 is comprised of an external blocking wheel 28A, 28B, etc. for each perforation row A, B, etc. on drum 20. When the perforation row A, or B, etc. is covered by the associated wheel 28A, or 28B, etc., the seeds thereunder are released from the drum depressions 22. FIG. 6 shows that inside drum 20, a manifold 30 is positioned opposite blocking wheels 28A, 28B, etc. to collect the released seeds. The discharge means 26 also includes tubes (not shown) connected to the manifold for delivering the seeds to the respective planting elements.

Thus far the description could apply to almost any conventional multiple row pneumatic planter. However, FIG. 1 shows a shutoff means 32 which is the improvement of this invention. Shutoff means 32 is mounted to frame 12 above discharge means 26 to selectively engage the outside of drum 20, blocking the perforations in a plurality of rows at once. In FIG. 6, seeds destined for the planting elements associated with the blocked rows fall back to the bottom of drum 20 before reaching the manifold 30. Therefore, the field rows associated with those blocked drum perforation rows will not be seeded.

Figure 2:
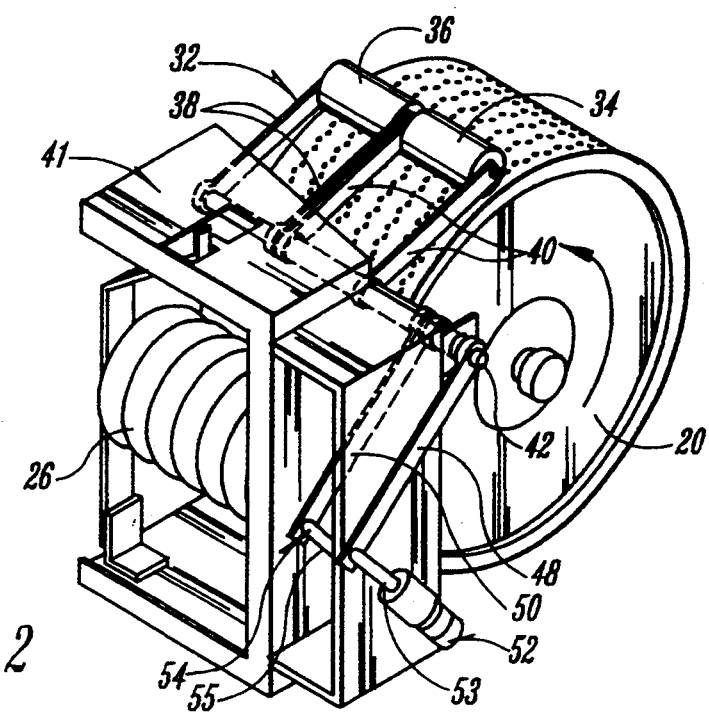
FIG. 2 is a perspective view showing the shutoff mechanism of this invention as applied to the perforated drum of the planter.

FIG. 2 shows that shutoff means 32 has two horizontal rollers 34 and 36. It should be noted that one or more or rollers can be used on each drum as the particular application requires. Rollers 34 and 36 are preferably made of a soft, resilient material, such as foam-rubber, so as to easily and completely cover the perforations when engaging the drum. Rollers 34 and 36 are mounted for rotation between a set of inboard brackets 38 and a set of outboard brackets 40 respectively. Brackets 38 and 40 are attached to a horizontal pivot shaft 42 which is mounted to frame 12 at support shield 41.

Figure 4:
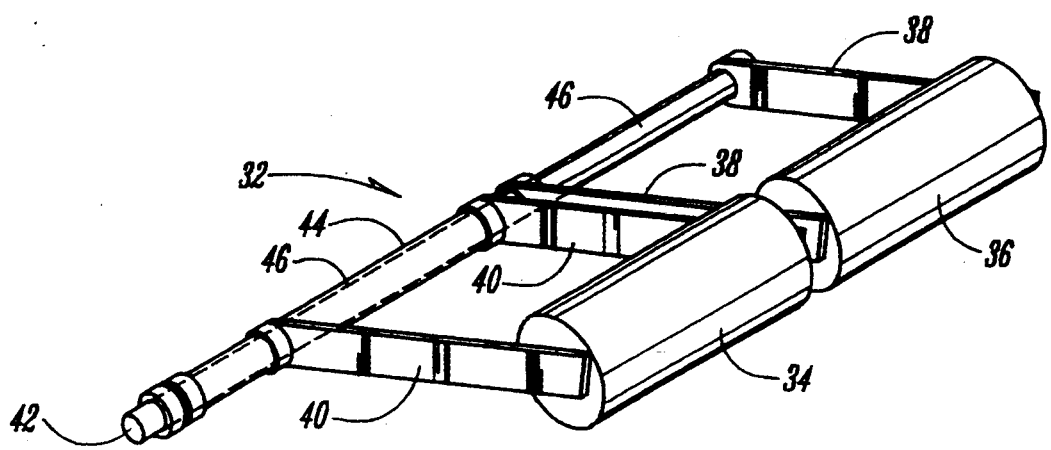
FIG. 4 is a perspective view of the pivot shaft and rollers of this invention.

FIGS. 3 and 4 show that shaft 42 includes an outer tube 44 to which outboard brackets 40 are attached by conventional split collars and rod 46 to which inboard brackets 38 are attached in a similar manner. In FIG. 4, rod 46 is shown to be of sufficiently small diameter to extend through the inside of outer tube 44, making the two rotatable independently of each other. FIG. 2 shows levers 48 and 50, each having one of their ends attached to rod 46 and tube 44 respectively. The other ends of levers 48 and 50 are attached to solenoids 52 and 54 at plungers 53 and 55 respectively. Plungers 53 and 55 are extendable by the application of electrical current to their respective solenoid. They retract in the absence of current.

Figure 7:
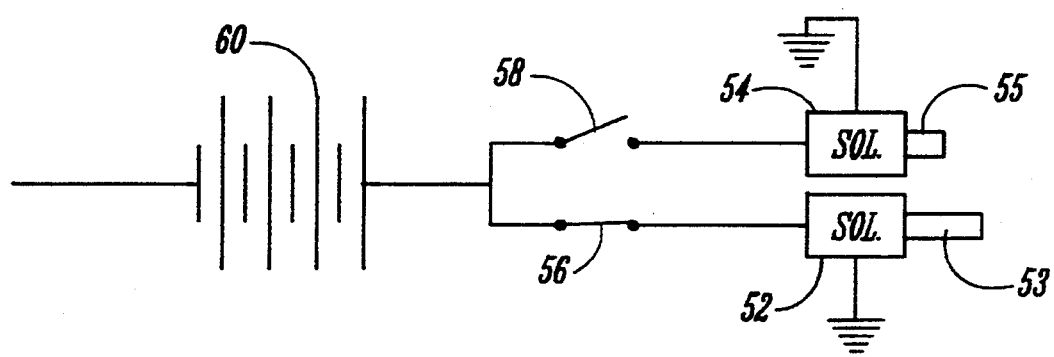
FIG. 7 is an electrical circuit diagram showing a two solenoid system.

FIG. 7 presents a simplified electrical schematic showing solenoid 52 activated or energized by the closing of toggle switch 56. A similar toggle switch 58 is provided for solenoid 54. In the preferred embodiment, both toggle switches 56 and 58 are remotely housed in a control box (not shown) located in the cab of the tractor pulling the planter. Appropriate indicator lights (also not shown) display the status of the circuit to the operator. At a glance the operator can tell which rows of the planter are dispensing seed. With switch 56 closed as shown, electrical current flows from a conventional power source 60, such as the battery of the tractor, to solenoid 52. Plunger 53 extends outwardly and swings inboard roller 36 against drum 20 to shutoff the covered rows. On the other hand, with switch 58 open, plunger 55 and thereby outboard roller 34 are in a retracted position which allows planting in the associated rows. With the circuit energized in this manner, the shutoff means 32 selectively engages drum 20 with rollers 34 and 36 as illustrated in FIG. 5.

Figure 5:
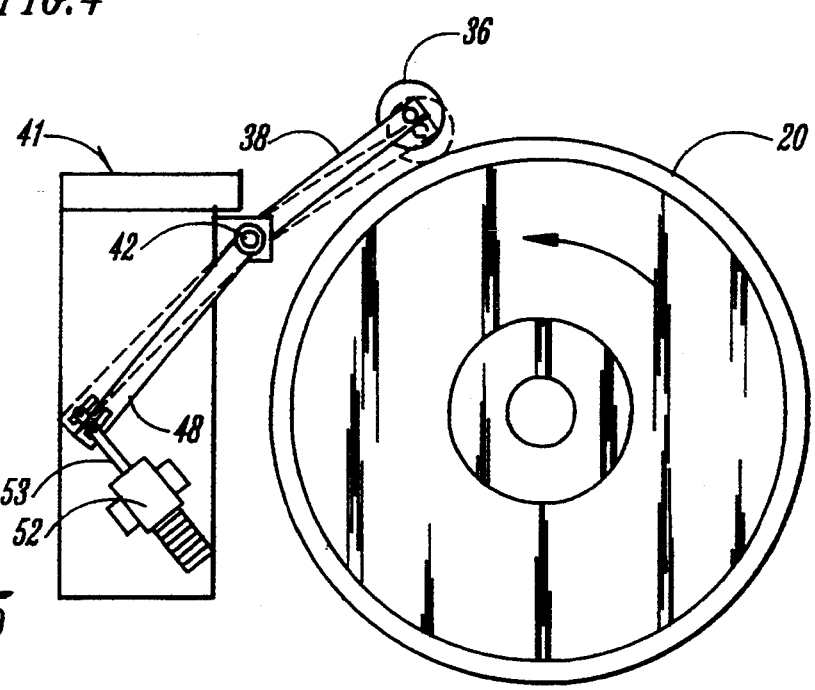
FIG. 5 is a front view of the shutoff mechanism of this invention showing how its rollers are swung into engagement with the drum by a solenoid valve.

The solid lines in FIG. 5 show the inboard roller 36 of shutoff means 32 in a position disengaged from drum 20. When switch 56 is closed, solenoid 52 is activated or energized as shown in FIG. 7 and plunger 53 is extended. The extension of plunger 53 moves lever 48 and rod 46 attached thereto in a clockwise direction. Since roller 36 is also attached via brackets 38 to rod 46, the roller pivots downwardly to engage the exterior of drum 20. As shown in FIG. 6, the rows of perforations under soft resilient roller 36 are covered, thereby releasing the seed therein before it can reach the discharge means and be routed for planting. For this purpose, it is preferable that the rollers engage the drum somewhere above the discharge means.

If the operator desires to shut off the other half of the planter, toggle switch 58 is independently closable to energized solenoid 54. Plunger 55 extends and roller 34 is swung into engagement with drum 20 by lever 50 and brackets 40 to shut off the rows thereunder.

It can be seen that the present invention has a great deal of flexibility. By electrical control, solenoids and telescopic (reference tube 44 and rod 46) mounting of the roller brackets it is possible to get several rollers of various widths on a single drum and control them individually. Large planters, for instance, those planting 24 rows, are known to use more than one drum. It is contemplated that one shutoff roller can be used on one 12 row drum while a second roller is independently operable on the second 12 row drum. An eight row planter was chosen to make the description and illustration of the invention less complex, but this shutoff means is equally applicable larger or smaller planters.

OPERATION OF THE INVENTION

It should be understood that this invention allows the operator to control the cessation and resumption of planting in a group of rows of a field. For instance, when intersecting end rows at an angle, the operator will not want to continue seeding from one half of the planter as this would double seed the already seeded end rows. To remedy this situation, the operator closes switch 58 to activate solenoid 54 which swings roller 34 onto drum 20 and shuts off the outboard side (rows A, C, E and G) of the planter. As the outboard side of the planter turns in the end row double planting is avoided. When the planter is out of the end row, the operator can flip toggle switch 58 back to its original position and planting resumes at the associated planting elements.

It can be seen that the present invention at least accomplishes its stated objectives.

What is claimed is:

1. An external shutoff means on the rotary seed selector drum of a multiple row pneumatic seed planter, comprising:
   a transverse frame;
   a plurality of seed planting elements on said frame;
   a hollow rotary drum mounted on said frame for holding seed and regulating delivery of seed to each of said seed planter elements for planting; the circumference of said drum having a plurality of spaced apart rows of seed retaining perforations such that each of said rows corresponds to one of said seed planting elements;
   an air blower on said frame connected to the interior of said drum whereby said blower forces seeds into said perforations and holds them there by radial pneumatic bias so long as said perforations are not blocked;
   a discharge means mounted on said frame for dislodging seeds one row at a time from said perforations and delivering seeds to said respective seed planting elements;
   a shutoff means movably mounted on said frame for selectively engaging the outside of said rotary drum above said discharge means and thereby covering at least one of said rows of perforations so that radial pneumatic bias from said air blower ceases to hold the seeds in said covered row of perforations and seeds held therein are dislodged before said discharge means can deliver them for planting;
   said shutoff means including a pivot shaft mounted adjacent said drum on said frame, a rigid first lever arm bracket having one end attached to said pivot shaft, a roller mounted adjacent said drum on another end of said first lever arm bracket for rotation with respect thereto, a rigid first actuating arm attached to said pivot shaft generally opposite of said first lever arm bracket for rotating said pivot shaft such that said roller pivots into engagement with the outside of said rotary drum, and first actuating means for moving said first actuating arm with respect to said frame and thereby rotating said pivot shaft;
   pivot shaft comprising a tubular outer member mounted adjacent to said drum on said frame and an inner rod mounted on said frame so as to extend concentrically through said tubular outer member and terminate in an elongated exposed end,
   said exposed end of said rod having a rigid second lever arm bracket with a second roller mounted thereon attached to said rod,
   a second actuating arm and second actuating means being attached to said rod, whereby said first roller and said second roller are independently engagable with said drum by the respective first and second actuating means, and
   control means connected to said actuating means to selectively operate said shutoff means to cause the delivery of seeds from said covered perforations to said planting elements associated therewith to cease.

2. The device of claim 1 wherein said control means comprises an electrical control box having a plurality of normally open switches, each located between a source of electrical power and said solenoid of respective actuating means, whereby the operator can energize said solenoid valve by closing said switch and the status of said switch is displayed by an associated indicator light on said control box.

* * * * *